Feb. 20, 1940.                C. F. DENNEY                2,191,273
                                 HEATER
                     Original Filed Feb. 21, 1933    7 Sheets-Sheet 1

INVENTOR
COURTLANDT F. DENNEY
BY
*William G. M. Knight*
his ATTORNEY

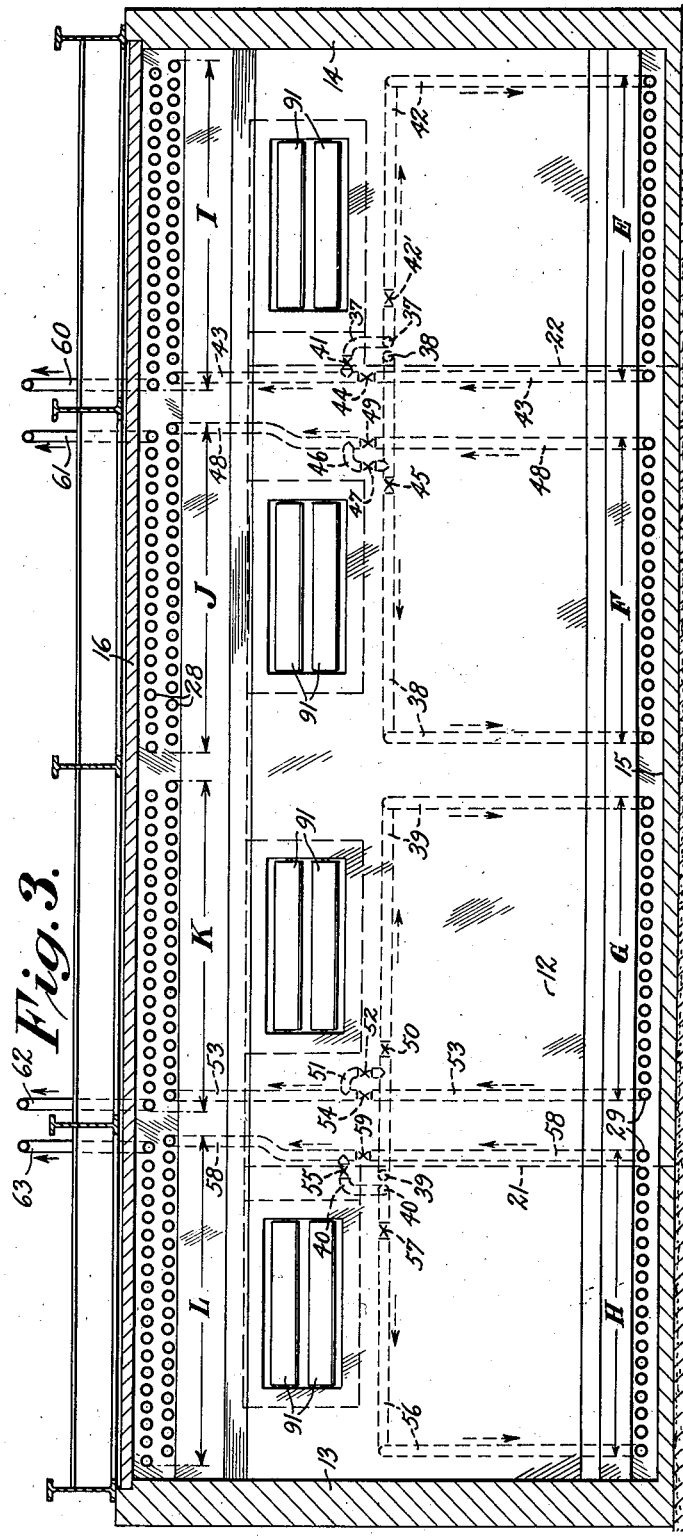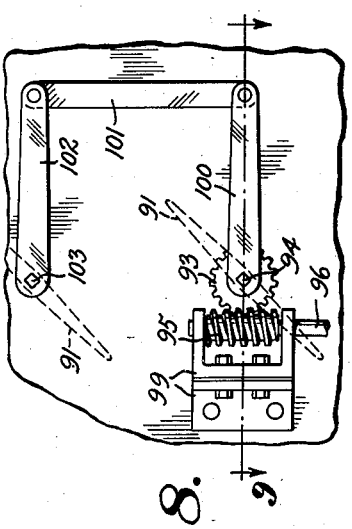

Feb. 20, 1940.  C. F. DENNEY  2,191,273
HEATER
Original Filed Feb. 21, 1933   7 Sheets-Sheet 4

INVENTOR
COURTLANDT F. DENNEY
BY
William G. McKnight
his ATTORNEY

Feb. 20, 1940.                C. F. DENNEY                2,191,273
                                HEATER
                     Original Filed Feb. 21, 1933    7 Sheets-Sheet 6
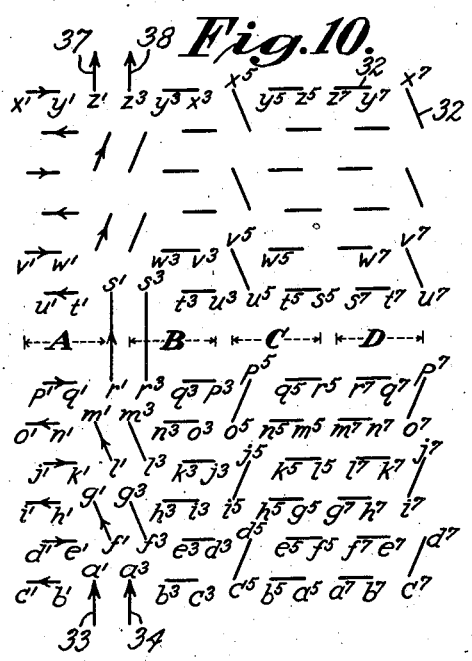
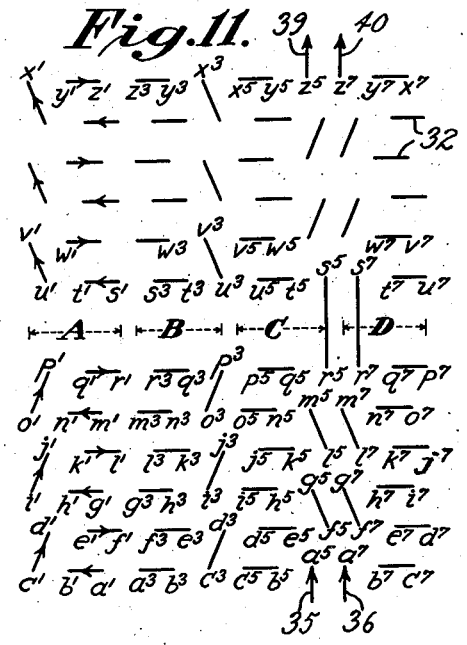
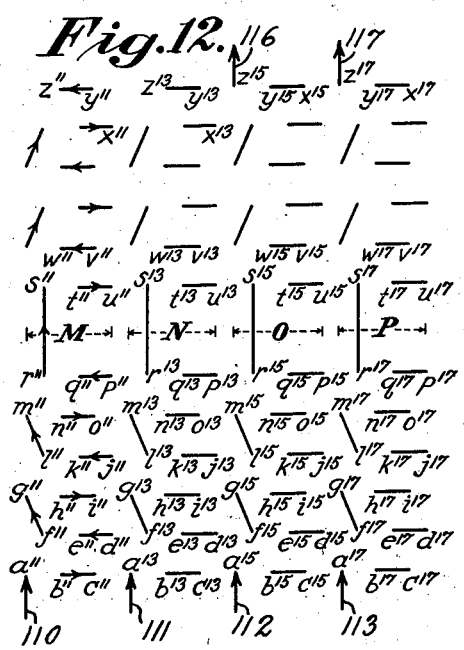
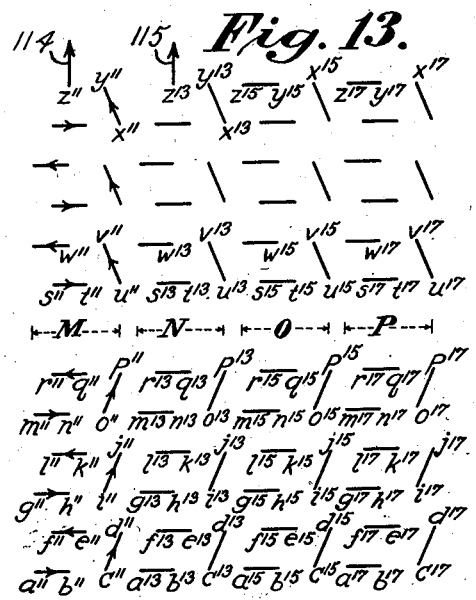
INVENTOR
COURTLANDT F. DENNEY
BY
William G. McKnight
his ATTORNEY

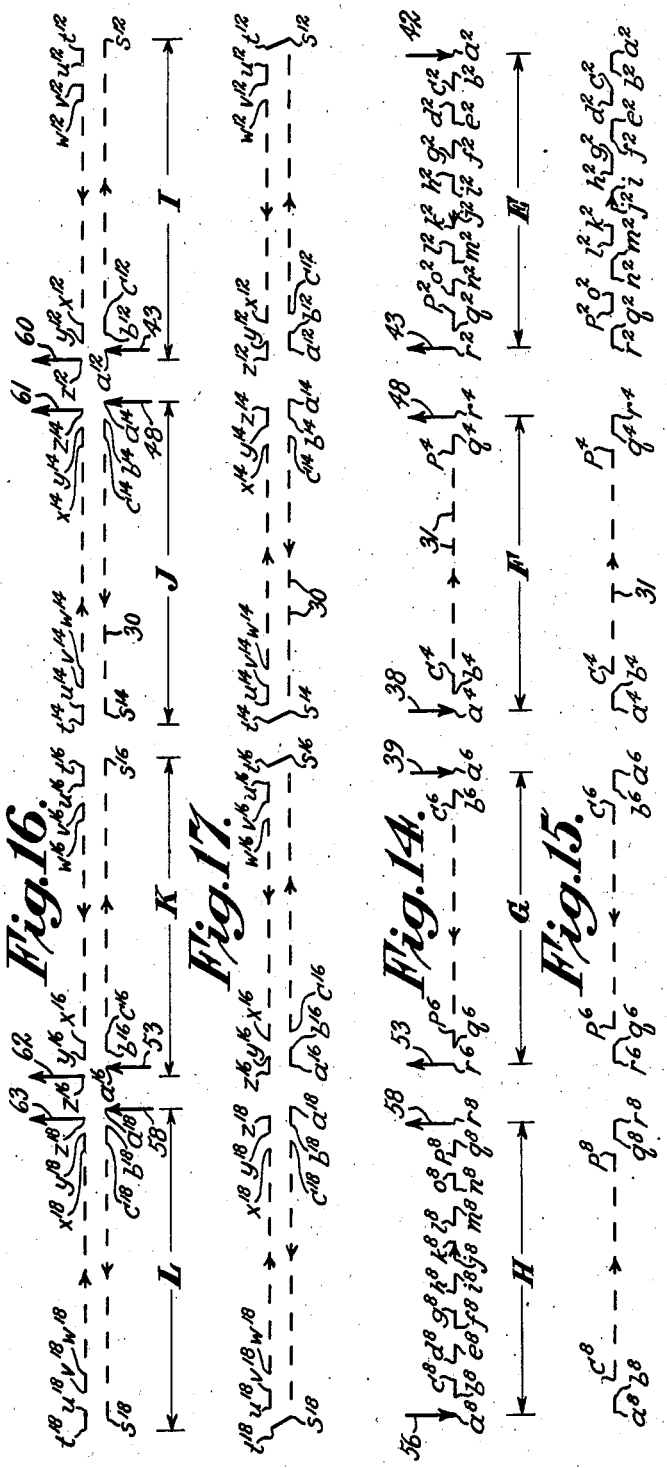

Patented Feb. 20, 1940

2,191,273

UNITED STATES PATENT OFFICE 2,191,273

HEATER

Courtlandt F. Denney, Westfield, N. J., assignor to Foster Wheeler Corporation, New York, N. Y., a corporation of New York Application February 21, 1933, Serial No. 657,799
Renewed January 6, 1938

21 Claims. (Cl. 196—110)

This invention relates to heaters and more particularly relates to tube stills for heating fluids such as petroleum, vegetable oils and the like.

The primary object of the invention is to provide an improved method and apparatus for heating fluids such as petroleum to desired temperatures with an accurate and flexible temperature control.

This object is attained in general by causing the fluid to be heated to flow in one or more confined streams through a heat absorbing zone, subjecting the fluid to the heat of one or more streams of products of combustion flowing through the heat absorbing zone and controlling the one or more streams of products of combustion, either as to volume or direction or both, to thereby control the quantity of heat absorbed by each stream of fluid in passing through the heat absorbing zone. The fluid in passing through the heat absorbing zone is preferably, but not necessarily, subjected principally to radiant heat and the fluid prior to its introduction into the said heating zone may be preheated to any desired degree by the products of combustion leaving the said heating zone or otherwise.

The principles of the invention will be fully understood from the following description, when considered in connection with the accompanying drawings forming a part of this specification and in which:

Fig. 3 is a transverse sectional view, taken on line 3—3 of Fig. 1;

Fig. 8 is an enlarged view of part of the damper operating mechanism;

Fig. 9 is a sectional view taken on line 9—9 of Fig. 8;

Figure 1:
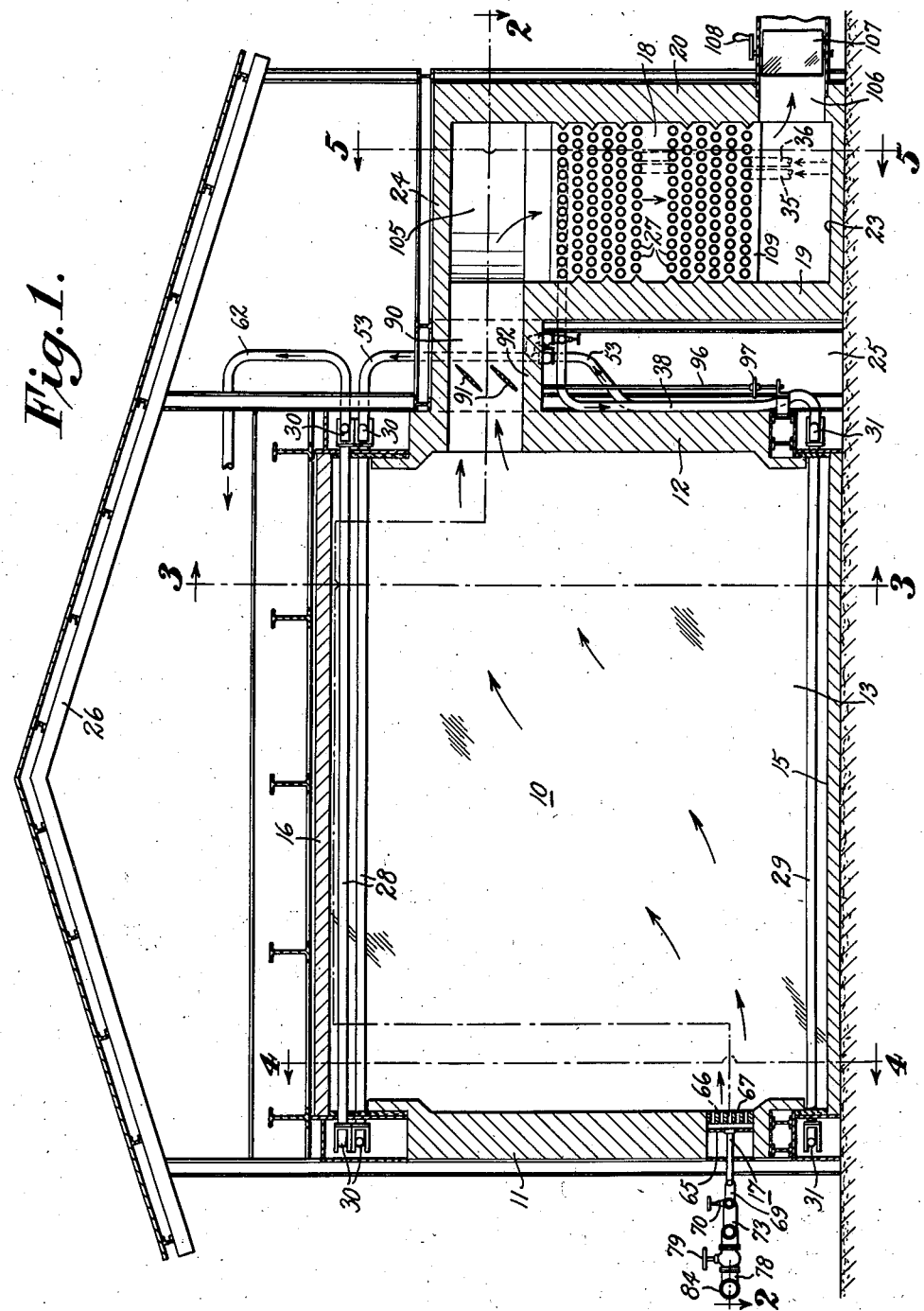
Fig. 1 is a transverse sectional view of a tube still embodying the present invention, the section being taken substantially on line 1—1 of Fig. 2.
Figure 5:
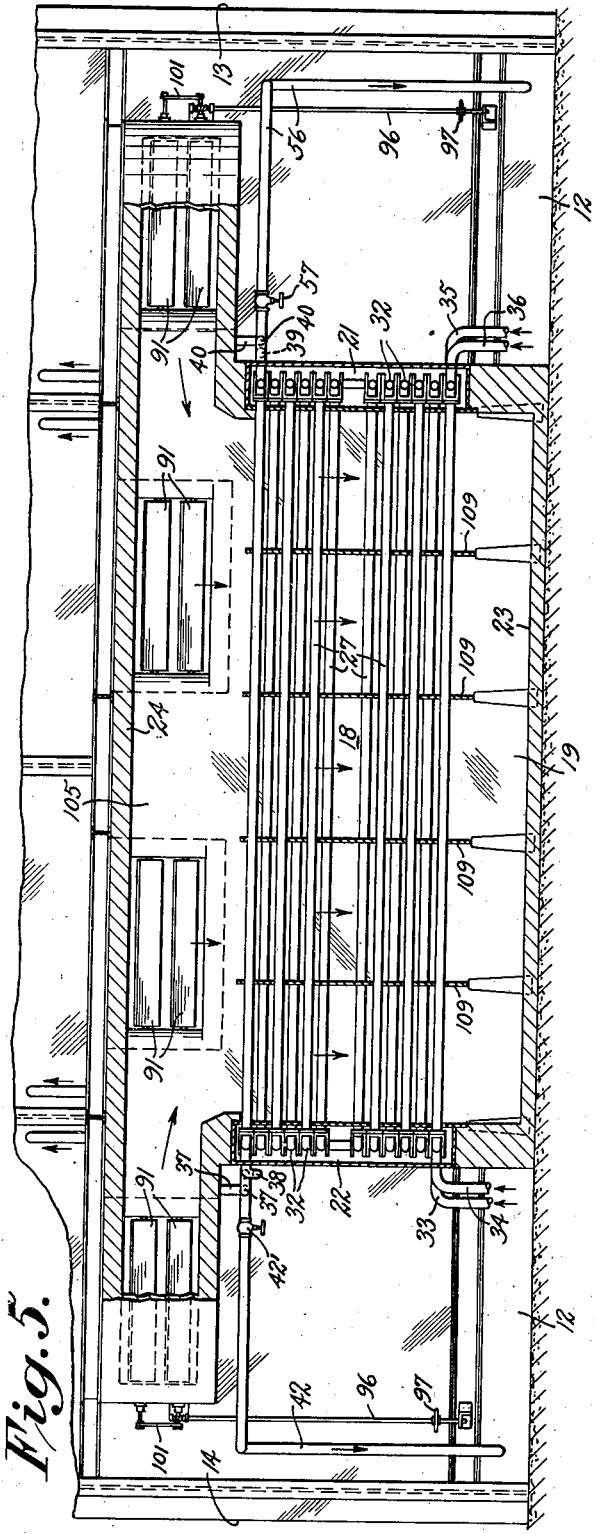
Fig. 5 is a sectional view, taken on line 5—5 of Fig. 1.
Figure 6:
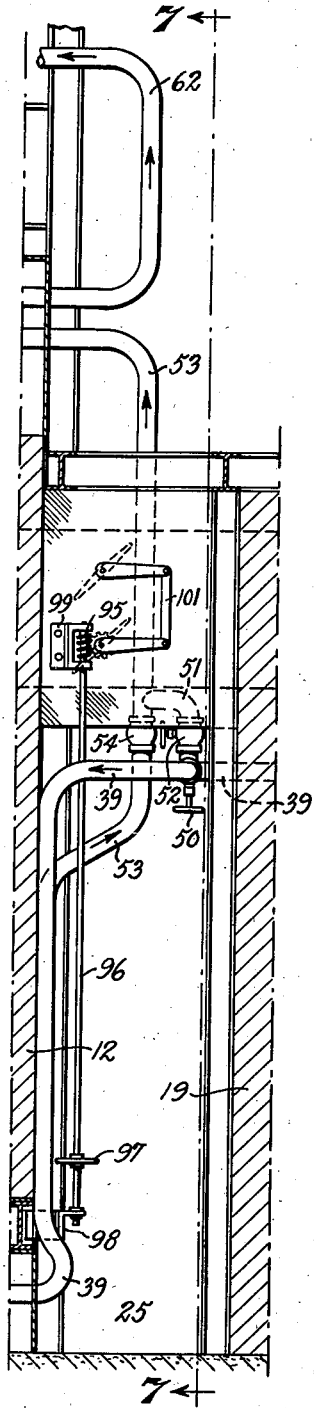
Fig. 6 is a longitudinal sectional view on a somewhat enlarged scale, taken on the line 6—6 of Fig. 2.
Figure 7:
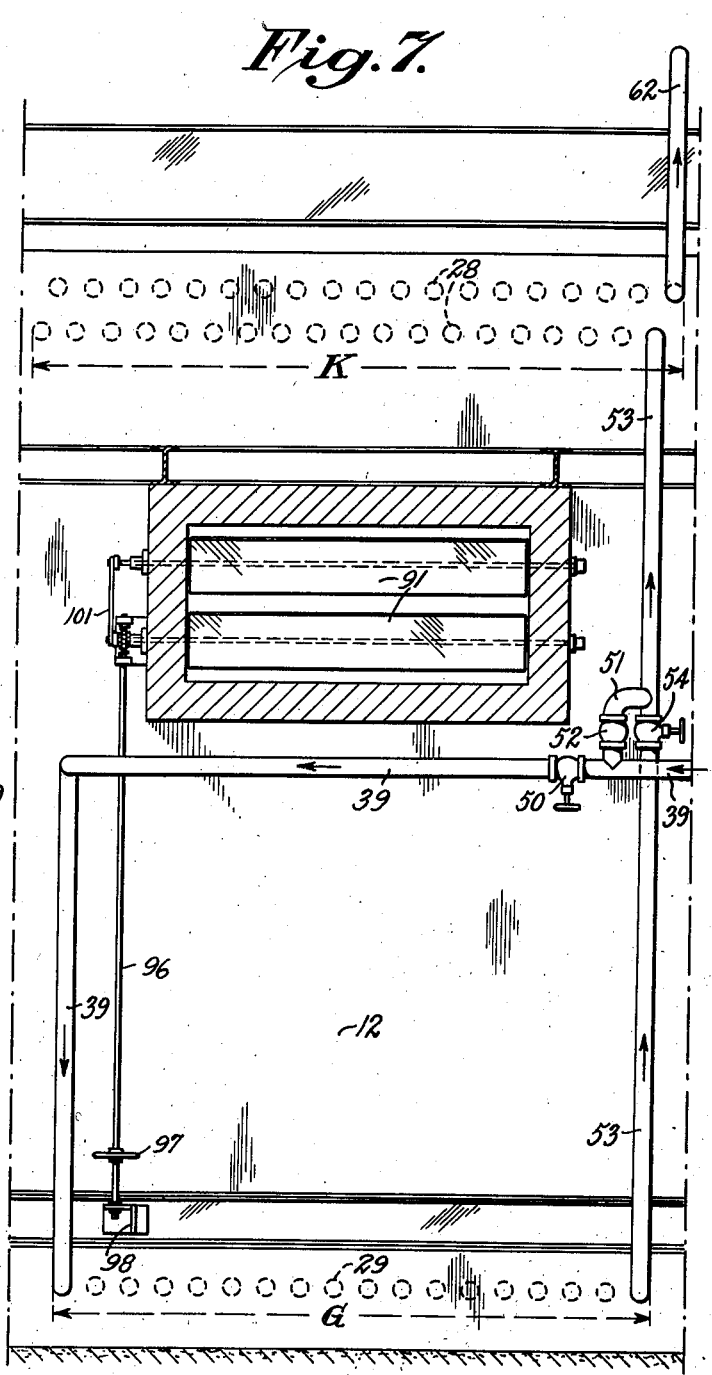
Fig. 7 is an enlarged sectional view taken substantially on line 7—7 of Fig. 6.

Figs. 10 and 11 are diagrammatic views illustrating one arrangement of the tubes and connecting headers of the convection bank, Fig. 10 indicating the arrangement of the headers at the left hand end of the convection bank as seen in Fig. 5 looking from left to right, while Fig. 11 is a view of the header arrangement of the right hand end of the convection bank also looking from left to right with regard to Figure 5;

Figs. 12 and 13 are diagrammatic illustrations of another arrangement of tubes and headers of the convection bank, the figures being similar to Figs. 10 and 11, respectively;

Figs. 14 and 15 are diagrammatic views illustrating the arrangement of tubes and headers of the tube bank disposed above the floor of the furnace chamber, Fig. 14 illustrating the header arrangement of the right hand end of the floor tube bank as seen in Fig. 1, looking from left to right toward the headers, while Fig. 15 indicates the header arrangement of the left hand end of the floor tube bank also looking from left to right with regard to Figure 1; and Figs. 16 and 17 are diagrammatic views illustrating the arrangement of the tubes and headers of the tube bank disposed below the roof of the furnace chamber, Fig. 16 illustrating the header arrangement of the right hand end of the tube bank as seen in Fig. 1, looking from left to right toward the headers, while Fig. 17 illustrates the header arrangement of the left hand end of the tube bank also looking from left to right with regard to Figure 1.

Like characters of reference refer to like parts throughout the several views.

Figure 2:
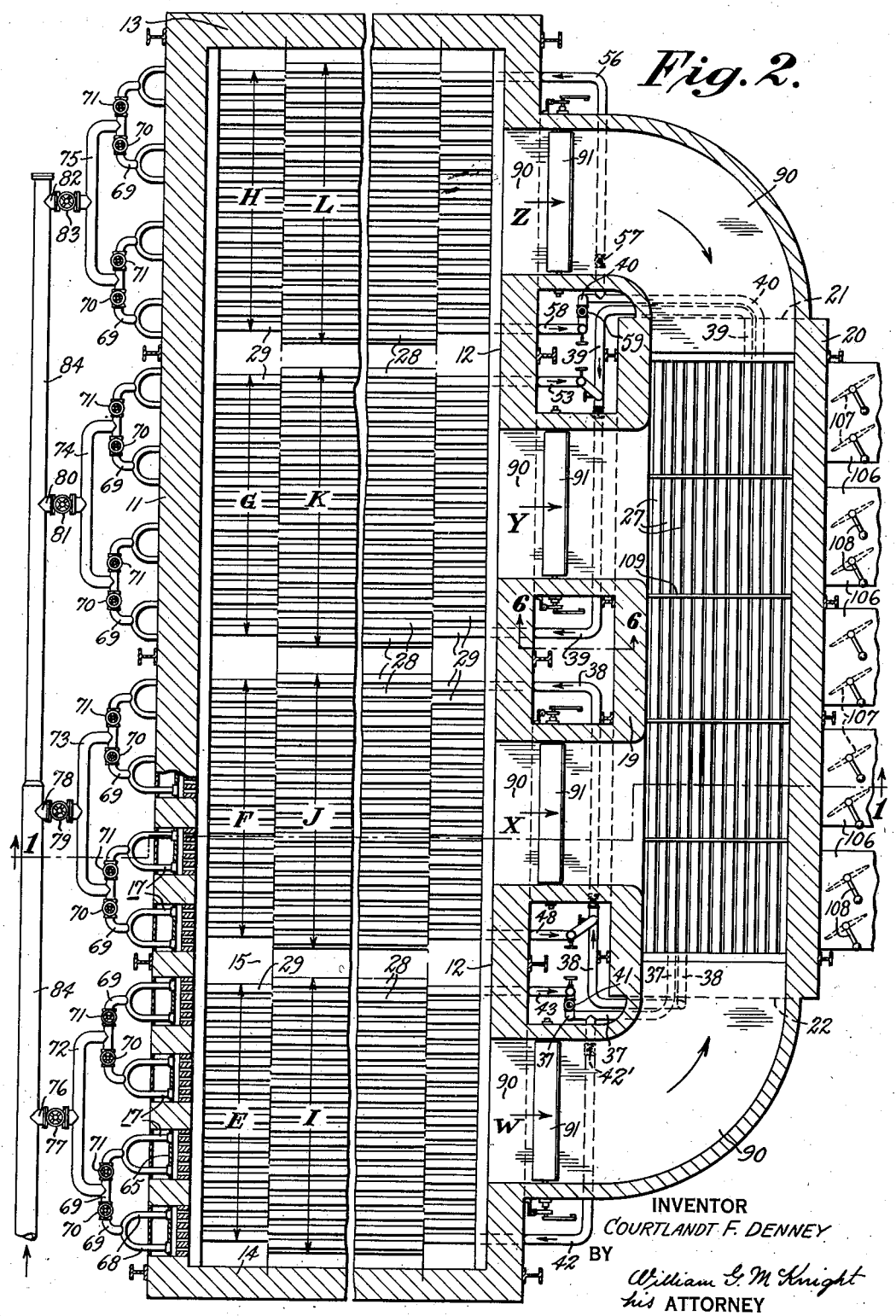
Fig. 2 is a longitudinal sectional view, taken substantially on the broken line 2—2 of Fig. 1.
Figure 4:
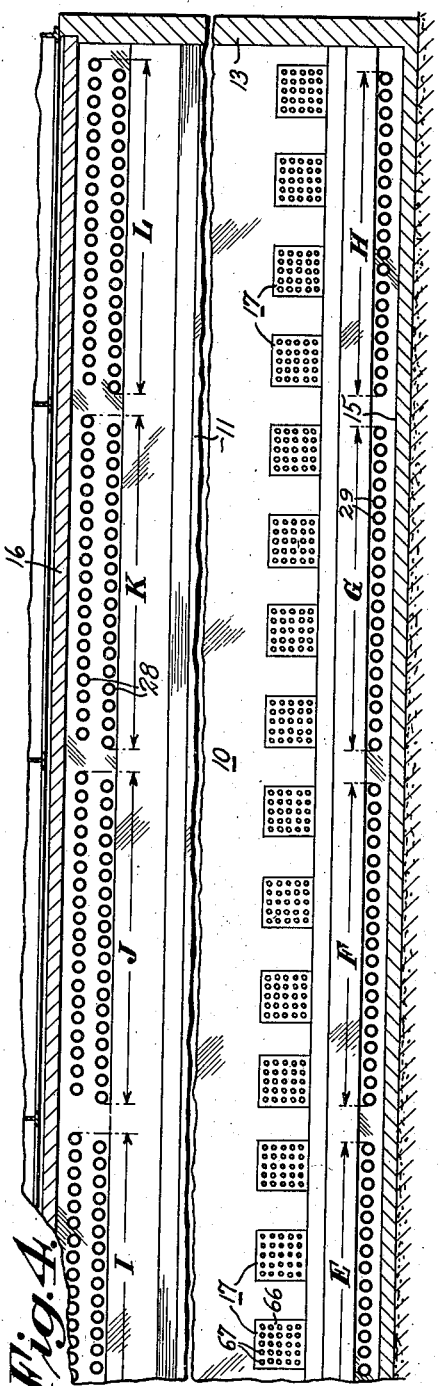
Fig. 4 is a transverse sectional view, taken substantially on line 4—4 of Fig. 1.

Referring to the drawings, reference character 10 designates a furnace or heating chamber having a front wall 11, rear wall 12, side walls 13 and 14, floor 15 and roof 16. Suitable means, such as the burners 17, are provided for effecting the combustion of fuel and providing relatively intense sources of radiant heat in the heating chamber. As shown in Figs. 1, 2 and 4, burners 17 are disposed in front wall 11 but may be otherwise located if desired. The specific arrangement of the burners and their construction will presently be described. A convection heat absorbing chamber 18 disposed to the rear of heating chamber 10, or to the right thereof as viewed in Fig. 1, is enclosed by a front wall 19, rear wall 20, side walls 21 and 22, floor 23 and roof 24. As shown, wall 19 is spaced from wall 12 to provide a space or alleyway 25 which extends the length of said walls. Roof 24 of the convection section is shown at a somewhat lower level than the roof 16 of the furnace chamber 10. A suitable roof structure 26 covers the chambers 10 and 18.

A bank of fluid conveying tubes 27 is disposed in the convection section 18 and the fluid flowing through these tubes is heated by absorbing heat from the products of combustion which flow over the tubes 27 in direct contact therewith. As indicated in the drawings, these tubes extend longitudinally of the convection section and are arranged in vertically spaced rows with the tubes of each row staggered with respect to the tubes in the adjacent row or rows.

A bank of radiant heat absorbing tubes 28 is disposed in the furnace chamber 10 under and immediately below the entire roof 16 and as shown, extend transversely, or in a direction at right angles to the direction of extent of the tubes 27 of the convection bank. The fluid flowing through these tubes is heated principally by absorbing heat radiated from the products of combustion flowing through the furnace chamber 10. As shown, the tubes 28 are arranged in two vertically spaced superposed rows with the tubes in one row staggered with respect to the tubes in the other row. It will be understood, however, that the tubes 28 may be arranged in a single row or in any desired number of rows and may extend under a portion only of the furnace roof, if desired.

Another bank of radiant heat asorbing tubes 29 is disposed in the furnace chamber 10 immediately above the floor 15. As shown, these tubes 29 extend transversely to the direction of extent of the tubes 27 and are arranged in a single row, but it will be understood that more than one row may be used and that the tubes may extend parallel to the tubes 27, if desired. As in the case of the roof tubes 28, the fluid flowing through the floor tubes 29 is heated principally by absorbing heat radiated from the streams of products of combustion flowing through the furnace chamber 10. It will be understood that fluid conveying tubes may also, if desired, be disposed in one or more of the walls 11, 12, 13 and 14.

The fluid to be heated enters the lower end of the convection bank of tubes 27 and after flowing through the entire bank is conducted to the radiant heat absorbing tubes 29 and after flowing therethrough is conducted to the radiant heat absorbing tubes 28 where it preferably enters the lower row of tubes and after flowing therethrough enters and flows through the upper row of tubes after which it is withdrawn from the still. If desired, however, the fluid after passing through the tubes 27 may be delivered directly to the roof tubes 28 in which event, the floor tubes 29 would be omitted, or the fluid may be delivered to both the floor and roof tubes from the tubes 27, as will presently be described. The roof tubes 28 of the radiant heat absorption section are connected by suitable headers or return bends 30 in such manner that the fluid to be heated flows through the tubes 28 in one or more paths of flow. The floor tubes 29 are connected by suitable headers 31 so that the fluid to be heated flows through those tubes in one or more paths of flow, and the tubes 27 of the convection bank are connected by headers or return bends 32 in such manner that the fluid passing therethrough flows through the tubes 27 in one or more paths of flow. The number of the paths of flow through the convection, floor and roof tubes is preferably but not necessarily equal. As illustrated in the drawings, the tubes in the convection and both radiant heat banks are connected by headers so arranged as to provide four separate and independent paths of fluid flow through the entire still.

One possible header arrangement of the tubes 27 of the convection bank is shown in Figs. 10 and 11. Referring to these figures, the fluid to be heated enters the convection bank through four separate inlets 33, 34, 35 and 36, the first two of these inlets being disposed at the left hand end of the bank as seen in Fig. 5 and the other two inlets being disposed at the right hand end of said bank. Fluid for the first path of flow indicated A on the drawings, enters inlet 33 and flows through tube 27 designated $a^1$ which is connected to the inlet 33 and into and through the header indicated $a^1 b^1$ connecting the right hand ends of the tubes $a^1$ and $b^1$ as seen in Fig. 5, to the adjacent tube $b^1$ to the left of the tube $a^1$ as seen in Fig. 10 and in the same row therewith. From tube $b^1$ the fluid flows into and through header $b^1 c^1$ at the left hand end of the tubes, as seen in Fig. 5, thence through header $c^1 d^1$ to the tube $d^1$ in the row of tubes immediately above the bottom row, thence through header $d^1 e^1$ to tube $e^1$, through tube $e^1$ to header $e^1 f^1$, from tube $f^1$ to header $f^1 g^1$ to tube $g^1$ in the row immediately above, thence through tube $g^1$, header $g^1 h^1$, tube $h^1$, header $h^1 i^1$, tube $i^1$ and through header $i^1 j^1$ to tube $j^1$ in the row above, and thence through the other tubes and headers in the first path of flow in alphabetical order in the same manner until the fluid reaches tube $r^1$. From tube $r^1$ the fluid flows through header $r^1 s^1$ to tube $s^1$ in the row of tubes immediately above the row in which the tube $r^1$ is disposed, and through tube $s^1$ and header $s^1 t^1$ to and through tube $t^1$ to header $t^1 u^1$, through tube $u^1$ and header $u^1 v^1$ to tube $v^1$ in the row immediately above, and thence through header $v^1 w^1$ to tube $w^1$ and thence upwardly to the succeeding rows and through the tubes in each row in the first path of flow as has been described, to tube $x^1$ in the uppermost row of the bank of tubes 27 until the fluid reaches the tube $z^1$ which is connected at its left hand end as shown in Fig. 5 to the connecting line 37 from which the fluid may be delivered to either the roof tubes 28 or the floor tubes 29, or both as desired.

The fluid for the second path of fluid flow, indicated B on the drawings, enters inlet 34 connected to tube $a^3$ in the lowermost row of the tubes 27, and with reference now to Figs. 10 and 11, the fluid flows through tube $a^3$, header $a^3 b^3$, tube $b^3$, header $b^3 c^3$, tube $c^3$, header $c^3 d^3$ to the tube $d^3$ in the row immediately above the lowermost row, through tube $d^3$ and header $d^3 e^3$, through tube $e^3$, header $e^3 f^3$, tube $f^3$, header $f^3 g^3$ to tube $g^3$ in the next row above, and thence in like manner in alphabetical order through the tubes and headers of the second path of flow in the succeeding rows above until the fluid flows to and through tube $r^3$ whence it flows through header $r^3 s^3$ to and through tube $s^3$ in the next row above through header $s^3 t^3$, tube $t^3$, header $t^3 u^3$, tube $u^3$ and header $u^3 v^3$ to tube $v^3$ in the row next above, and thence in like manner through the tubes and headers of the second path of flow in the succeeding rows in order until the fluid reaches tubes $z^3$ in the uppermost row of tubes 27 of the convection bank, whence the fluid will be conducted through connecting line 38 to that part of the second path of fluid flow in the radiant heat absorbing tubes 28 or 29 or both.

The fluid for the third path of fluid flow indicated C, will enter the inlet 35 which is connected to tube $a^5$ (Figs. 10 and 11), in the lowermost row of tubes 27 of the convection bank and will flow in alphabetical order through the tubes and headers designated by the letters $a, b, c,$ etc., with the exponent "5" in a manner similar in all respects to the manner in which the fluid flows through the convection bank of tubes 27 in the first and second paths of flow. In view of the foregoing explanation of the manner in which the fluid flows through that part of the first and second paths which lie in the convection bank, it is deemed unnecessary to describe in detail the paths of flow through the third and fourth paths except in a general way. The fluid in the third path flows through the convection bank until it reaches the tube $z^5$ in the uppermost row of tubes of the convection bank whence it is conducted through connecting line 39 to the radiant heat absorbing section.

The fluid for the fourth path of flow through the still, indicated D, enters through inlet 36 connected with tube $a^7$ (Figs. 10 and 11) in the lowermost row of tubes 27 of the convection bank, and flows in alphabetical order through the tubes and connecting headers of the fourth path upwardly through the several rows of tubes until the fluid reaches tube $z^7$ disposed in the uppermost row of tubes of the convection bank in a manner similar to the manner in which the fluid flows through the first three paths of flow in the convection bank. From tube $z^7$ the fluid flows through connecting line 40 to the radiant heat absorbing section of the furnace.

At this point it is deemed desirable to describe the arrangement of the connections of the floor tubes 29 and the roof tubes 28 in the radiant heat absorbing section of the still.

As shown, the floor tubes 29 are so connected by the headers 31 as to provide four independent paths of fluid flow, indicated E, F, G and H. Fluid for path E enters through pipe 42 (Figs. 14 and 15) and flows through tube indicated $a^2$ to header $a^2$ $b^2$ to and through tube $b^2$, header $b^2$ $c^2$ tube $c^2$ and so on in like manner through the remaining tubes and headers in the path E in alphabetical order until the fluid reaches the last tube in the path E, designated $r^2$, and flows from the path through pipe 43. Fluid for the second path F enters through pipe 38 and flows through tube $a^4$, header $a^4$ $b^4$, tube $b^4$, header $b^4$ $c^4$, tube $c^4$ and so on in like manner in alphabetical order through the remaining tubes and headers in path F until the fluid reaches the last tube $r^4$ in the path and is conducted from the path by pipe 48. Fluid for path G enters through pipe 39 and flows through tube $a^6$, header $a^6$ $b^6$, tube $b^6$, header $b^6$ $c^6$, tube $c^6$ and so on in the same manner in alphabetical order through the remaining tubes and headers in path G until the fluid reaches tube $r^6$ and is conducted from the path through pipe 53. Fluid for the fourth path H enters through pipe 56 and flows through tube $a^8$, header $a^8$ $b^8$, tube $b^8$, header $b^8$ $c^8$, tube $c^8$ and so on in a similar manner through the remaining tubes in path H until the fluid reaches tube $r^8$ and is withdrawn from the path through pipe 58.

As shown, the roof tubes 28 are connected by the headers 30 so as to also provide four separate and independent paths of fluid flow, I, J, K and L. Referring now more particularly to Figs. 16 and 17, fluid for path I enters through pipe 43 and flows into and through tube $a^{12}$ in the lower row of roof tubes 28 and into and through header $a^{12}$ $b^{12}$, to and through tube $b^{12}$, thence through header $b^{12}$ $c^{12}$ to and through tube $c^{12}$ and in like manner through the succeeding tubes and headers of the path I in alphabetical order as indicated in Figs. 16 and 17, until the fluid reaches the tube $s^{12}$ at the end of the lower row of tubes in path I, whence the oil will flow through header $s^{12}$ $t^{12}$ to the end tube $t^{12}$ of the upper row, then through said tube and header $t^{12}$ $u^{12}$, to and through tube $u^{12}$ to header $u^{12}$ $v^{12}$ and so on in the same manner in alphabetical order through the tubes and headers of the path I in the upper row until the fluid reaches the tube indicated $z^{12}$, whence the fluid will flow therefrom into the outlet 60 which conducts the fluid passing through the path I from the still. Fluid for the second path J of the roof tubes enters through pipe 48 and flows into and through tube $a^{14}$ through header $a^{14}$ $b^{14}$, tube $b^{14}$, header $b^{14}$ $c^{14}$ and so on in the same manner through the remaining tubes and headers of the second path J in the lower row of the tubes 28 until the fluid reaches tube $s^{14}$ in the lower row whence it will be conducted through header $s^{14}$ $t^{14}$ to tube $t^{14}$ in the upper row of tubes 28 and will flow therethrough and through header $t^{14}$ $u^{14}$ to tube $u^{14}$ and thence in like manner through the remaining tubes and headers in the upper row of the second path J until the fluid reaches the tube $z^{14}$ from which it will be conducted from the still through outlet 61. Fluid for the third path K enters through pipe 53 and flows into and through tube $a^{16}$, header $a^{16}$ $b^{16}$, tube $b^{16}$ and through the tubes and connecting headers in alphabetical order in a manner similar to that previously described through the lower row of tubes of the path K until the fluid reaches tube $s^{16}$ whence it will be conducted through headers $s^{16}$ $t^{16}$ to tube $t^{16}$ in the upper row of tubes in path K, whence it will flow through the upper row of tubes and connecting headers of the path K until it reaches tube $z^{16}$, from which it will be withdrawn through outlet 62 and conducted from the still. Fluid for the fourth path L through the roof tubes 28 enters through pipe 58 and flows into and through pipe $a^{18}$, header $a^{18}$ $b^{18}$, tube $b^{18}$ and so on in alphabetical order through the tubes and connecting headers of the lower row of path K until it reaches tube $s^{18}$ at the end of the lower row, whence it flows through header $s^{18}$ $t^{18}$ to the end tube $t^{18}$ in the upper row of tubes of path L and thence through the upper row of tubes and connecting headers of this path to tube $z^{18}$ from which it is withdrawn through outlet 63.

In the form of the invention shown, the paths of fluid flow through the convection section are connected to the paths through the radiant heat section in the following manner: Referring particularly to Figs. 2, 3 and 5, connecting line 37 extends toward the furnace 10 and connects with a pipe 43 which conducts fluid from the group A of floor tubes 29. Pipe 37 is controlled by a valve 41. A pipe 42 controlled by a valve 42' connects with line 37 and is adapted to conduct fluid from line 37 to the group E of floor tubes 29. A valve 44 controls line 43. With this arrangement, it will be seen that fluid from the first path of flow through the convection bank of tubes 27 may be conducted either to the floor tubes and thence to the roof tubes 28, or may be delivered directly from the convection tubes to the roof tubes or may be delivered to both the roof tubes and floor tubes. Other types of connections for accomplishing this result may be utilized if desired. Line 38, which conveys fluid from tube group B, connects with group F of the floor tubes and is controlled by a valve 45. Line 48 connects group F with group J of the roof tubes and is controlled by a valve 49. Line 46, controlled by valve 47, connects line 38 with line 48 so that, if desired, the fluid may be delivered from the convection bank directly to the roof tubes without passing through the floor tubes or the fluid may be delivered to both the roof tubes and the floor tubes. Line 39, controlled by valve 50, connects group C of the convection bank with group G of the floor tubes and line 53, controlled by valve 54, connects group G with group K of the roof tubes. Line 51, controlled by valve 52, connects line 39 directly with line 53 so that the fluid from group C of the convection bank may be delivered directly to group K of the roof tubes, without passing through the floor tubes or may be delivered to both. Line 40, controlled by valve 55, connects group D of the convection tubes with line 58, controlled by valve 59 which connects floor tube group H with roof tube group L and line 56, controlled by valve 57, connects line 40 with the floor tube group H. With this arrangement, fluid may be delivered from group D directly to group L without passing through floor tube group H or it may be delivered to both groups L and H.

As shown, principally in Figs. 2, 3 and 4, floor tube groups E, F, G and H are disposed directly under the roof tube groups I, J, K and L respectively.

It will thus be seen, that in the exemplification of the invention heretofore disclosed, four separate and independent paths of flow are provided for the fluid in its passage through both the convection and radiant heat absorbing sections of the still. In order to satisfactorily control the quantity of heat absorbed by the fluid in each of the several paths of flow, burners 17 are preferably arranged and disposed so that each burner or group of burners supplies a stream of products of combustion flowing through the heating chamber, which is more or less separate from each of the other streams of combustion gases, and with each of the said streams normally flowing, in general, in a direction such that the central portion of the stream lies substantially in a vertical plane which passes substantially through the central portion of each of the groups of tubes 28 and 29, which constitute the several paths of flow through the radiant heat absorbing section. This arrangement of the burners is particularly well shown in Figs. 2 and 4 of the drawings, wherein it will be seen that the burners 17 are arranged in four groups of four burners each. Each of the groups of burners 17 is arranged substantially centrally of each of the groups of tubes 28 and 29, which constitute the several paths of fluid flow through the radiant heating section as previously described, or in other words, a vertical plane which passes centrally through each group of burners 17 will pass through the approximate center of each group of tubes 28 and 29 which forms the several paths of fluid flow through the radiant heat absorbing section.

Burners 17, as shown, are gas burners, but it will be understood that any other types of burners, such as coal, oil or the like, may be employed without departing from the principle of the invention. Each burner 17 comprises a rectangular distributing member 65 and a plurality of refractory blocks 66 provided with circular apertures 67. The blocks 66 are shown more or less diagrammatically in the drawings and the blocks 66 for each burner appear to be a single block, but it will be understood that the refractories for each burner are comprised of a plurality of block units. As best shown in Fig. 2, each distributing member 65 has two spaced gas pipes 68 secured thereto and which are connected at their opposite ends to gas headers 69, the arrangement being such that each header 69 supplies gas for two adjacent burners. A valve 70 in each header 69 controls the supply of gas to one of the burners 17 connected thereto and another valve 71 in each header 69 controls the supply of gas to the other burner connected thereto. Headers 69 which supply gas to the four burners 17 disposed in the zone of tube groups E and I (Fig. 2) are connected to a header 72, the ends of the header 72 being connected between the valves 70 and 71 as shown. Header 72 is in turn connected by connection 76 controlled by valve 77 to gas manifold 84. Headers 69 which supply gas to burners 17 in the zone of tube groups F and J are connected to a header 73 which is in turn connected by connection 78 controlled by valve 79 to manifold 84. Headers 69 which supply gas to the burners 17 in the zone of tube groups G and K are connected to a header 74 which is connected to manifold 84 by connection 80 controlled by valve 81 and the headers 69 which supply gas to the burners in the zone of tube groups H and L are connected to a header 75 which is connected to manifold 84 by connection 82 controlled by valve 83. With this arrangement, it will be apparent that the burners 17 may be individually controlled as to intensity of firing or shut off altogether by the proper manipulation of the valves 70 and 71, and that the groups of burners in the zones of each of the tube groups in the radiant section may be controlled by manipulation of the valves 77, 79, 81 and 83. In this manner a close, accurate and flexible control of the firing of the still and the radiant heat absorbed by the fluid in each of the several paths of flow may be obtained.

To also control the temperature of the fluid passing through each of the paths of flow or to control the quantity of heat absorbed by the fluid flowing through each of the paths of flow, means are provided for controlling the direction of flow of the several streams of products of combustion from the burners 17 through the furnace chamber 10 to the convection bank 27. As shown, such means comprises a plurality of spaced flues 90 with dampers 91 controlling the flues. Each of the flues 90 is preferably disposed in line with a group of burners 17 and the corresponding groups of tubes 28 and 29 which constitute the several paths of fluid flow through the furnace chamber 10 as indicated in Figs. 2 and 3. The flues 90 serve to conduct the products of combustion from the heating chamber 10 to the convection bank of tubes 27. In the form of the still shown in the drawings, the convection chamber 18 is shorter in length than the width of the furnace chamber or, in other words, the distance between the side walls 21 and 22 of the convection chamber 18 is less than the distance between the side walls 13 and 14 of the heating chamber 10. With this arrangement the two end flues 90 pass through wall 12 and are curved to connect with the ends of the upper part of the convection chamber, as shown in Figs. 2 and 5. The two central flues 90 pass both through walls 12 and 19 and have their outlets connected with the convection chamber and are separated from the alleyway 25 by walls 92. As indicated, each flue 90 is controlled by two cooperating dampers 91 which are mounted so as to rotate in a horizontal plane. Any suitable means may be utilized for operating these dampers. As shown, particularly in Figs. 5, 6, 7, 8 and 9, the lower damper of each of the sets of dampers has a gear 93 fixed to the damper shaft 94. Gear 93 meshes with a worm 95 fixed to one end of a vertically disposed operating shaft 96 having a hand wheel 97 fixed adjacent the opposite end. Shaft 96 supported at its ends by brackets 98 and 99 as clearly shown, is disposed so that the hand operating wheel 97 is located in the alleyway 25. An arm 100, fixed at one end to each of the lower damper shafts 94, is pivoted at the other end to a link 101 which in turn is pivoted to an arm 102 which is fixed at one end to the upper damper shaft 103. With this arrangement it will be seen that the two dampers in each flue are interconnected so as to be operated simultaneously and that the dampers in each flue may be readily operated so as to be open to any desired degree or entirely closed.

A collecting chamber is provided intermediate the flues 90 and the bank of convection tubes 27 in order to commingle the separate streams of products of combustion passing through the several flues 90 before the products of combustion flow over the tubes in the convection bank. As shown, the collecting chamber indicated 105 is disposed above the bank of convection tubes 27 and immediately to the rear, or to the right as seen in Fig. 1, of the flues 90. From the collecting chamber 105 the products of combustion flow over the convection bank of tubes 27 and pass from the bottom of the convection section 18 through a plurality of outlet flues 106 which conduct the combustion gases to a stack or induced draft fan, not shown. Each of the outlet flues 106 is controlled by two cooperating dampers 107 which may be actuated by any suitable means such as the levers 108 shown. As shown in Fig. 2, the outlet flues 106 are five in number but it will be evident that any other convenient number of outlet flues may be employed.

The tubes 27 of the convection bank are supported intermediate their ends by a plurality of tube supporting plates indicated 109 in Figs. 2 and 5.

The operation is as follows: The fluid to be heated enters each of the several paths of flow through inlets 33, 34, 35 and 36 and flows through that part of each of the paths of flow previously described, which lie in the convection bank. From the convection bank the fluid is conducted through connecting lines 37, 38, 39 and 40 to the floor tubes 29 and thence to the roof tubes 28 or to both the floor tubes and roof tubes depending upon the position of the valves in the connections between the convection tubes and the floor and roof tubes as previously described. From the roof tubes, the fluid is conducted from the still through outlets 60, 61, 62 and 63. Gas or other suitable fuel is supplied to the burners 17 and these burners effect the combustion of the fuel supplied thereto and are the sources of separate and independent streams of products of combustion which flow from the burners through the heating chamber, to and through the flues 90. It will be understood that these streams of products of combustion are sources of radiant heat and that with the arrangement of the several paths of fluid flow through the tubes 28 and 29, together with the corresponding arrangement of the burners 17 and the flues 90, as previously described, it will be apparent that the fluid flowing through the several paths of flow will absorb radiant heat from each of these streams, the amount or quantity of the heat so absorbed depending, of course, upon the operation of the burners 17 and/or the positions of the dampers 91 in the flues 90. The products of combustion which pass through flues 90 enter the collecting chamber 105 where the products of combustion of the several streams are commingled and thus flow downwardly over and in contact with the tubes 27 of the convection bank through the convection chamber 18 where the fluid flowing through the several paths of flow absorbs heat by convection from the products of combustion. The products of combustion are conducted from the convection chamber through the flues 106 and are conducted to a stack or induced draft fan. It will be evident that the burners 17 and dampers 91 in the flues 90 or either the burners or the dampers may be so operated as to control the quantity or radiant heat absorbed by the fluid passing through each of the several paths of flow. For example, should it be desired that the fluid passing through the path indicated I or EI in Figs. 2 and 3 be not heated to as high a temperature as the fluid passing through the other paths of flow indicated J, K and L or FJ, GK and HL in the same figures, it will merely be necessary to operate dampers 91 in flue 90, which is indicated W in Fig. 2, so that the products of combustion from the group of burners 17 for the path I or EI are diverted to one or more of the other flues X, Y and Z, or alternatively or as supplementary to the flue control, the intensity of the firing of the group of burners 17 directly below the path I or EI may be somewhat diminished so that heat radiated from the stream of products of combustion issuing from this group of burners 17 will not be as intense. In like manner it will be seen that by properly controlling the several flues W, X, Y and Z by the operation of the dampers 91, and/or by controlling the intensity of firing of the several groups of burners, the quantity of heat absorbed in each of the several paths of fluid flow through tubes 28 and/or 29, and consequently the temperature of the fluid withdrawn from each of said paths of flow may be readily and closely controlled. With this arrangement, great flexibility of temperature control may be obtained. Obviously, the dampers 91 may all be maintained in fully opened position and the desired temperature control obtained by the proper control of the several groups of burners, due to the fact that the flues 90 serve as a series of orifices which tend to distribute the flow of gases from the furnace irrespective of any throttling action in the flues.

By properly operating the dampers 107 which control the several flues 106 connected to the lower part of the convection chamber 18, the distribution of the heating gases over the convection bank of tubes 27 may be controlled as desired.

One of the principal advantages of the invention resides in the fact that a single still may be employed for multi-stage distillation of fluids, such as petroleum oils. The oil for the first stage may be passed through two paths of flow and heated to the desired temperature, while the bottoms from the first stage may be passed through the other two paths of flow and heated to such higher temperature as may be desired.

It will of course be understood that the arrangements of tubes, connecting headers and fluid inlets and outlets may be otherwise than has been described to provide the necessary paths of flow through the still. For example, the arrangement of the tubes and headers in the convection chamber 18 may be as shown in Figs. 12 and 13. With this arrangement the fluid for the first path M will enter inlet 110 to tube $a^{11}$ and and will flow in alphabetical order through the tubes and headers of the first path upwardly through the bank of tubes to the tube $z^{11}$ in a manner similar to the manner previously described for the flow of fluids through the paths of flow indicated in Figs. 10 and 11. The fluid will be withdrawn from tube $z^{11}$ through connecting line 114 which may deliver the fluid to the floor or roof tubes or both as tube 37 does. The fluid for the second path N will enter inlet 111 to tube $a^{13}$ from which it will be conducted through the tubes and headers of the convection part of the path N to connecting line 115 which may be connected with the floor and roof tubes as tube 38 is connected. Fluid for the third path O will enter inlet 112 to tube $a^{15}$ and will flow through the convection part of this path until it reaches tube $z^{15}$ in the uppermost row of the bank of tubes 27 and will be conducted therefrom through connecting line 116 to the floor and roof tubes. The fluid for the fourth path P will enter inlet 113 to tube $a^{17}$ and will flow through the convection part of this path until it reaches tube $z^{17}$ in the uppermost row of the convection bank and will be conducted therefrom through connecting line 117 to the floor and roof tubes. With this arrangement it will be seen that the inlets for the several paths of flow through the convection bank are all at the same end of the tube bank. Other arrangements, of course, may be utilized if desired.

Obviously, it would be entirely within the limits of the invention to provide a single path of fluid flow through the convection section and provide for the desired number of paths of flow through the radiant heat absorbing section.

It will be understood that various modifications and alterations in the form, location and disposition of the various parts of the still shown and described, may be made without departing from the principles of the invention. It will further be understood that the invention is not to be limited except by the scope of the appended claims.

What is claimed is:

1. The method of heating fluids which comprises passing the fluid through a convection heating zone to heat the fluid to a predetermined temperature, passing the fluid in a plurality of separate streams through a radiant heat absorbing zone, subjecting the streams of fluid in the radiant heat absorbing zone to the heat radiated from a plurality of separate streams of products of combustion flowing through said zone, controlling the direction of flow of said streams of products of combustion through said zone to thereby control the quantity of heat absorbed by each of said fluid streams, introducing the products of combustion from the radiant heat absorbing zone into a collecting zone disposed adjacent the convection heating zone and controlling the flow of said products of combustion from the collecting zone through the convection zone.

2. The method of heating oil which comprises passing the oil in a plurality of separate streams through a convection heat absorbing zone to heat the oil to a predetermined temperature, passing the oil from the convection heat absorbing zone in a plurality of separate streams through a radiant heat absorbing zone wherein the several streams of oil are subjected to the heat radiated from a plurality of streams of products of combustion flowing through the radiant heat absorbing zone, controlling the direction of flow of said streams of products of combustion through said radiant heat absorbing zone to thereby control the quantity of heat absorbed by the oil in the several paths of flow through said zone, introducing the products of combustion from the radiant heat absorbing zone into a collecting zone disposed intermediate the radiant heat absorbing zone and the convection heat absorbing zone and controlling the flow of products of combustion from said collecting zone through the convection heat absorbing zone.

3. Apparatus for heating fluids comprising a convection heat absorbing chamber, means for passing the fluid through said chamber, a radiant heat absorbing chamber, means for passing the fluid from the convection heat absorbing chamber in a plurality of separate streams through the radiant heat absorbing chamber, means for effecting the combustion of fuel to provide a plurality of separate streams of products of combustion in the radiant heat absorbing chamber which normally flow in substantially the direction of flow of said fluid streams, each of said streams of products of combustion providing a source of radiant heat to which the several streams of fluid passing through the radiant heat absorbing chamber are subjected, means for causing lateral displacement of the several streams of products of combustion in the radiant heat absorbing chamber, means for introducing the products of combustion from the radiant heat absorbing chamber into the convection heat absorbing chamber, and means for controlling the distribution of the streams of products of combustion in flowing through the convection heat absorbing chamber.

4. Apparatus for heating fluids comprising a convection heat absorbing chamber, means for passing the fluid through said chamber, a radiant heat absorbing chamber, means for passing the fluid from the convection heat absorbing chamber in a plurality of separate streams through the radiant heat absorbing chamber, means for effecting the combustion of fuel to provide a plurality of separate streams of products of combustion in the radiant heat absorbing chamber which normally flow in substantially the direction of flow of said fluid streams, each of said streams of products of combustion providing a source of radiant heat to which the several streams of fluid passing through the radiant heat absorbing chamber are subjected, means for controlling the direction of flow of the several streams of products of combustion through the radiant heat absorbing chamber, means for commingling the several streams of products of combustion subsequent to their passage through the radiant heat absorbing chamber, means for introducing said products of combustion into the convection heat absorbing chamber and means for controlling the distribution of said products of combustion in flowing through the convection heat absorbing chamber.

5. A tube still for heating oil and the like comprising side walls and a roof, a plurality of oil heating tubes disposed under and adjacent the roof, said tubes being arranged so as to provide a plurality of separate paths of flow of the oil through the tubes, a plurality of separate means for effecting the combustion of fuel to provide a plurality of separate streams of products of combustion which are adapted to pass through the still below said tubes, said means being disposed in one of said walls, a plurality of flues in the opposite wall and means for controlling each of said flues to thereby control the direction of flow of the streams of products of combustion through said still.

6. A tube still for heating oil and the like which comprises side walls and a roof, a plurality of tubes disposed under and adjacent the roof, said tubes being arranged to provide a plurality of separate paths of flow of the oil through the still, a plurality of burners disposed in one of the walls of the still, said burners being arranged to provide a stream of products of combustion initially for each of the separate paths of flow of the oil passing through the roof tubes, a flue for each of said separate streams of products of combustion disposed in the wall of the still opposite the wall in which the burners are disposed and means for controlling each of said flues to control the direction of flow of the streams of products of combustion through the still to thereby control the quantity of heat absorbed by the oil in each of the paths of flow.

7. A tube still for heating oil and the like comprising a convection heat absorbing chamber and a radiant heat absorbing chamber, a bank of fluid conveying tubes in the convection heat absorbing chamber, a plurality of tubes in the radiant heat absorbing chamber, said tubes being arranged to provide a plurality of separate paths of flow of the oil through the radiant heat absorbing chamber, a plurality of burners in the radiant heat absorbing chamber, said burners being arranged to provide a stream of products of combustion in the radiant heat absorbing chamber for each of the several paths of flow of the oil flowing through said chamber to heat the oil in said paths of flow preponderantly by radiation, a plurality of flues disposed oppositely to the burners and connecting the radiant heat absorbing chamber and the convection heat absorbing chamber, and dampers in said flues for controlling the flow of products of combustion therethrough.

8. A tube still for heating oil and the like comprising a convection heat absorbing chamber and a radiant heat absorbing chamber, a bank of fluid conveying tubes in the convection heat absorbing chamber, a plurality of tubes in the radiant heat absorbing chamber, said tubes being arranged to provide a plurality of separate paths of flow of the oil through the radiant heat absorbing chamber, a plurality of burners in the radiant heat absorbing chamber, said burners being arranged to provide a stream of products of combustion in the radiant heat absorbing chamber for each of the several paths of flow of the oil flowing through said chamber, a plurality of flues connecting the radiant heat absorbing chamber and the convection heat absorbing chamber, dampers in said flues for controlling the flow of products of combustion therethrough, and a collecting chamber between said flues and the convection heat absorbing chamber to commingle the streams of products of combustion prior to their passage through the convection heat absorbing chamber.

9. A tube still for heating oil and the like comprising a convection heat absorbing chamber, a radiant heat absorbing chamber, a bank of fluid conveying tubes in the convection heat absorbing chamber, a plurality of tubes in the radiant heat absorbing chamber, said tubes being arranged so as to provide a plurality of separate paths of flow of the oil through the radiant heat absorbing chamber, a plurality of burners in the radiant heat absorbing chamber, said burners being arranged to provide a stream of products of combustion in the radiant heat absorbing chamber for each of the several paths of flow of the oil flowing through said chamber to heat the oil in said paths of flow preponderantly by radiation, a plurality of flues disposed oppositely to the burners and adapted to conduct products of combustion to the convection heat absorbing chamber, and dampers in said flues for controlling the flow of the products of combustion therethrough.

10. Apparatus for heating fluids comprising a single heating chamber, means for passing the fluid to be heated in a plurality of separate streams through tubes disposed in the heating chamber, means for effecting the combustion of fuel to provide a plurality of separate streams of products of combustion in the heating chamber, each of said streams of products of combustion normally flowing adjacent and longitudinally of the tubes through which flows a fluid stream and in such proximity thereto that heat radiated from the streams of products of combustion will be absorbed by and will principally heat the fluid streams, means providing a plurality of passages communicating with the heating chamber through which the streams of products of combustion flow in leaving the chamber, dampers in said passages, and means for controlling the means for effecting the combustion of fuel to control the volume of products of combustion in each stream thereof to control the heat radiated therefrom to thereby control the temperature to which each of the fluid streams is heated.

11. The method of heating fluids which comprises passing the fluid in a confined stream through a heating zone, subjecting the fluid principally to the heat radiated from a stream of products of combustion flowing through said zone out of the path of flow of the fluid, and controlling the displacement of the stream of products of combustion from its normal direction of flow through said zone in a direction laterally of said confined stream, independently of the source of said stream, to thereby control the quantity of radiant heat absorbed by the fluid in the confined stream.

12. The method of heating fluids which comprises passing the fluid in a plurality of separate confined streams through a heat absorbing zone, subjecting the fluid principally to the heat radiated from a plurality of separate streams of products of combustion flowing through said zone out of the paths of flow of the fluid, and controlling the displacement of the several streams of products of combustion from their normal direction of flow through said zone in directions laterally of said confined streams respectively, independently of the source of said streams, to thereby control the quantity of radiant heat absorbed by the fluid in each of the confined streams.

13. The method of heating fluids which comprises passing the fluid through a first heating zone to heat the fluid to a predetermined temperature, passing the fluid from said first heating zone in a plurality of separate streams through a second heating zone, subjecting said plurality of fluid streams principally to the heat radiated from a plurality of streams of products of combustion normally flowing through the second heating zone in substantially the direction of flow of said fluid streams, and controlling the displacement of the several streams of products of combustion from their normal direction of flow through the second heating zone in directions laterally of said confined streams respectively, to thereby control the quantity of radiant heat absorbed by each of the several streams of fluid flow, at least one of said fluid streams absorbing a quantity of heat different from that absorbed by the other streams.

14. Apparatus for heating fluids comprising a heating chamber, means for passing the fluid to be heated in a plurality of separate streams through the heating chamber, each stream having a separate outlet from the chamber, means for controlling said outlets, means for effecting the combustion of fuel to provide a plurality of separate streams of products of combustion in the heating chamber which normally flow in substantially the direction of flow of said fluid streams and which provide sources of heat for said fluid streams, and means for causing lateral displacement of said streams of products of combustion in the heating chamber to thereby control the quantity of heat absorbed by each of the several streams of fluid.

15. Apparatus for heating fluids comprising a radiant heat absorbing chamber, means for passing the fluid to be heated in a plurality of separate streams through the heating chamber, each stream having a separate outlet from the chamber, means for controlling the outlets, means for effecting combustion of fuel to provide a plurality of separate streams of products of combustion in the heating chamber which normally flow in substantially the direction of flow of said fluid streams, each of said streams of products of combustion providing a source of radiant heat to which the several fluid streams are subjected, and means for causing lateral displacement of said streams of products of combustion from their normal direction of flow through the heating chamber to thereby control the quantity of radiant heat absorbed by each of the several fluid streams.

16. The method of heating fluids which comprises passing the fluid in a plurality of separate confined streams through a single heat absorbing zone, causing a plurality of streams of products of combustion to flow through the heat absorbing zone, each of the last mentioned streams normally flowing adjacent only one of the fluid streams so that the latter are heated principally by the absorption of heat radiated from the streams of products of combustion, causing the streams of products of combustion to flow from the heat absorbing zone through a plurality of openings, and controlling the volume of the products of combustion in each of the streams thereof to control the heat radiated therefrom to thereby control the temperature to which each of the fluid streams is heated, at least one of said fluid streams absorbing a quantity of heat different from that absorbed by the other streams.

17. Apparatus for heating fluids comprising a single heating chamber, means for passing the fluid to be heated in a plurality of separate streams through the heating chamber, means for effecting the combustion of fuel to provide a plurality of separate streams of products of combustion in the heating chamber, each of said streams of products of combustion flowing substantially longitudinally of and adjacent to a fluid stream and in such proximity thereto that heat radiated from the streams of products of combustion will be absorbed by and will principally heat the fluid streams, means providing a plurality of passages communicating with the heating chamber through which the streams of products of combustion flow in leaving the chamber, means for controlling the passages, and means for controlling the means for effecting the combustion of fuel to control the volume of products of combustion in each stream thereof to control the heat radiated therefrom to thereby control the temperature to which each of the fluid streams is heated.

18. A tube still for heating fluids comprising walls enclosing a single heating chamber, tubes disposed adjacent one of the walls and arranged to provide a plurality of separate streams of the fluid through the chamber, burners disposed in a second wall intersecting the first wall and arranged to provide a plurality of streams of products of combustion, one for each of the fluid streams, a plurality of flues disposed in a third wall opposite the second wall through which the streams of products of combustion flow upon leaving the chamber, said flues being arranged so that a stream of products of combustion normally flows longitudinally of the tubes through which flows each fluid stream and in such proximity that heat radiated from the streams of products of combustion will be absorbed by and principally heat the fluid streams, means for controlling the flues, and means for controlling the burners to control the volume of products of combustion in each stream thereof to control the quantity of heat radiated therefrom to thereby control the temperature to which each fluid stream is heated.

19. A tube still comprising a radiant heat absorbing chamber and a convection heat absorbing chamber, a wall separating said chambers, a plurality of fluid conveying tubes in the convection chamber, a plurality of fluid conveying tubes in the radiant heat absorbing chamber disposed adjacent the roof thereof and arranged so as to provide a plurality of separate fluid streams which flow through the radiant heat absorbing chamber, a plurality of burners disposed in the wall of said still opposite the wall separating said chambers, said burners being arranged to provide a plurality of separate streams of products of combustion which flow through the radiant heat absorbing chamber, one stream of products of combustion for each fluid stream, a plurality of flues equal in number to the streams of products of combustion in the wall separating said chambers and disposed in the upper portion of said last mentioned wall and through which the streams of products of combustion flow from the radiant heat absorbing chamber into the convection chamber, said flues being arranged so that the streams of products of combustion normally flow under and longitudinally of the tubes through which flows the fluid streams passing through said roof tubes, means for controlling the flues, and means for controlling said burners to control the volume of products of combustion in each of the streams thereof to control the heat radiated therefrom to thereby control the temperature to which the fluid in each of said streams is heated.

20. The method of heating fluids which comprises passing fluid in a plurality of confined streams through a heating zone having a plurality of outlet openings through which products of combustion flow from said zone, subjecting the fluid to the heat of a plurality of streams of products of combustion flowing through said zone in substantially the direction of flow of the fluid streams, and controlling the displacement of the several streams of products of combustion from their normal direction of flow through said zone in directions laterally of said confined streams respectively, by controlling the points at which the products of combustion flow from said zone to thereby control the quantity of heat absorbed by the fluid in each of the confined streams, at least one of said fluid streams absorbing a quantity of heat different from that absorbed by the other streams.

21. Apparatus for heating fluids comprising a heating chamber having a plurality of outlet openings through which products of combustion flow from said chamber, means for controlling said openings, means for passing fluid in a confined stream through the chamber, means providing a stream of products of combustion in the chamber which normally flows in substantially the direction of flow of the fluid stream, and means for causing and controlling the lateral displacement of the stream of products of combustion in the chamber by controlling the point at which the products of combustion flow from said chamber to thereby control the quantity of heat absorbed by the fluid in the confined stream.

COURTLANDT F. DENNEY.